(12) United States Patent
Burd et al.

(10) Patent No.: US 11,755,181 B2
(45) Date of Patent: Sep. 12, 2023

(54) POPULATING ANSWERS TO POLLING QUESTIONS BASED ON INITIAL RESPONSES

(71) Applicant: Google LLC, Mountain View, CA (US)

(72) Inventors: Emily Burd, New York, NY (US); Akshat Sharma, Cambridge, MA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/211,715

(22) Filed: Mar. 24, 2021

(65) Prior Publication Data

US 2022/0066603 A1    Mar. 3, 2022

Related U.S. Application Data

(60) Provisional application No. 63/070,220, filed on Aug. 25, 2020.

(51) Int. Cl.
| | |
|---|---|
| *G06F 3/0484* | (2022.01) |
| *G10L 25/51* | (2013.01) |
| *G10L 15/26* | (2006.01) |
| *H04L 65/403* | (2022.01) |

(52) U.S. Cl.
CPC ............ *G06F 3/0484* (2013.01); *G10L 15/26* (2013.01); *G10L 25/51* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 6,581,071 B1 * | 6/2003 | Gustman | G06Q 30/02 707/601 |
| 10,176,808 B1 | 1/2019 | Lovitt et al. | |
| 10,424,297 B1 | 9/2019 | Carino | |
| 10,452,652 B2 | 10/2019 | Sanchez et al. | |

(Continued)

FOREIGN PATENT DOCUMENTS

| | | |
|---|---|---|
| JP | H09281991 A | 10/1997 |
| WO | 2022006144 A2 | 1/2022 |

OTHER PUBLICATIONS

Grosvenor, Carrie, "Family Feud: The Rules of the Game", Sep. 25, 2018, liveabout, retrieved on Oct. 22, 2021, retrieved from <https://www.liveabout.com/family-feud-brief-overview-1396911>, pp. 1-3 (Year: 2018).*

(Continued)

*Primary Examiner* — Nicholas Klicos
(74) *Attorney, Agent, or Firm* — Lowenstein Sandler LLP

(57) ABSTRACT

Systems and methods for populating answers to polling questions based on initial responses. A graphical user interface (GUI) is provided to a set of participants of a conference call. The GUI includes a first portion that presents a polling question to be answered by the set of participants. A detecting is made that a first participant of the set of participants has provided a verbal answer to the polling question. The GUI provided to a second participant of the set of participants is modified to present, in a second portion, a textual form of the verbal answer provided by the first participant and a GUI element that allows the second participant to provide a non-verbal answer to the polling question via selection of the GUI element associated with the verbal answer provided by the first participant.

19 Claims, 8 Drawing Sheets

(56) References Cited

U.S. PATENT DOCUMENTS

| | | | |
|---|---|---|---|
| 11,250,857 B1* | 2/2022 | Kim | G06F 3/167 |
| 11,314,761 B1 | 4/2022 | Yestrau et al. | |
| 11,328,796 B1 | 5/2022 | Jain et al. | |
| 2002/0085030 A1 | 7/2002 | Ghani | |
| 2006/0286530 A1* | 12/2006 | Forrest | G09B 7/02 434/323 |
| 2007/0100938 A1 | 5/2007 | Bagley et al. | |
| 2008/0120101 A1 | 5/2008 | Johnson et al. | |
| 2008/0146342 A1* | 6/2008 | Harvey | A63F 13/352 463/42 |
| 2011/0231226 A1* | 9/2011 | Golden | G06Q 40/12 705/7.32 |
| 2011/0271204 A1* | 11/2011 | Jones | G06Q 10/10 715/753 |
| 2013/0166279 A1* | 6/2013 | Dines | G10L 15/063 704/8 |
| 2014/0229866 A1 | 8/2014 | Gottlieb | |
| 2015/0206156 A1* | 7/2015 | Tryfon | G06F 40/30 705/7.32 |
| 2016/0044226 A1* | 2/2016 | Williams | H04N 7/181 348/211.3 |
| 2016/0078458 A1* | 3/2016 | Gold | G06Q 30/0203 705/7.32 |
| 2017/0004515 A1* | 1/2017 | Wilmot | G06Q 30/0241 |
| 2018/0122256 A1* | 5/2018 | Smith | G09B 7/00 |
| 2018/0189382 A1 | 7/2018 | Mowatt | |
| 2018/0232752 A1* | 8/2018 | BaderEddin | H04M 3/563 |
| 2018/0359530 A1 | 12/2018 | Marlow et al. | |
| 2019/0073348 A1 | 3/2019 | Cheesman | |
| 2019/0088153 A1 | 3/2019 | Bader-Natal et al. | |
| 2019/0124128 A1 | 4/2019 | Bader-Natal et al. | |
| 2020/0042916 A1* | 2/2020 | Jaiswal | G06F 40/30 |
| 2020/0074294 A1 | 3/2020 | Long et al. | |
| 2020/0074873 A1* | 3/2020 | Alsarhan | G09B 7/02 |
| 2020/0334697 A1 | 10/2020 | Badereddin et al. | |
| 2020/0380468 A1 | 12/2020 | Crawford et al. | |
| 2021/0150155 A1 | 5/2021 | Kim et al. | |
| 2021/0191925 A1 | 6/2021 | Sianez | |
| 2021/0279622 A1 | 9/2021 | Bui et al. | |
| 2021/0377063 A1 | 12/2021 | Cutler et al. | |
| 2022/0138470 A1 | 5/2022 | Seleskerov et al. | |

OTHER PUBLICATIONS

Heinrich, Steve, "Quiplash: New Party Game Expands Audience Participation to 10,1000", Jun. 30, 2015, PlayStation Blog, retrieved on Oct. 22, 2021, retrieved from <https://blog.playstation.com/2015/06/30/quiplash-new-party-game-expands-audience-participation-to-10000/>, pp. 1-4 (Year: 2015).*

PCT International Search Report and Written Opinion for International Application No. PCT/US2021/039668 dated Jan. 20, 2022, 20 pages.

PCT International Search Report and Written Opinion for International Application No. PCT/US2021/041412 dated Dec. 9, 2022, 17 pages.

PCT International Search Report and Written Opinion for International Application No. PCT/US2022/041592 dated Mar. 16, 2023, 23 pages.

* cited by examiner

POPULATING ANSWERS TO POLLING QUESTIONS BASED ON INITIAL RESPONSES

RELATED APPLICATIONS

This non-provisional application claims priority to U.S. Provisional Patent Application No. 63/070,220 filed on Aug. 25, 2020 and entitled "POPULATING ANSWERS TO POLLING QUESTIONS BASED ON INITIAL RESPONSES," which is incorporated by reference herein.

TECHNICAL FIELD

Aspects and implementations of the present disclosure relate to populating answers to polling questions based on initial responses.

BACKGROUND

Video or audio-based conference call discussions can take place between multiple participants via a conference platform. A conference platform includes tools that allow multiple client devices to be connected over a network and share each other's audio data (e.g., voice of a user recorded via a microphone of a client device) and/or video data (e.g., a video captured by a camera of a client device, or video captured from a screen image of the client device) for efficient communication. A conference platform can also include tools to allow a participant of a conference call to pose a question to other participants (e.g., via a conference platform user interface (UI)) during the conference call discussion to solicit responses (referred to as polling). The conference platform can collect responses provided by the other participants and generate polling results.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for populating answers to polling questions based on initial responses. In an implementation, a graphical user interface (GUI) is provided to a set of participants of a conference call. The GUI includes a first portion that presents a polling question to be answered by the set of participants. In response to detecting that a first participant of the set of participants has provided a verbal answer to the polling question, the GUI provided to a second participant of the set of participants is modified to present, in a second portion, a textual form of the verbal answer provided by the first participant. The second portion also includes a GUI element that allows the second participant to provide a non-verbal answer to the polling question via selection of the GUI element associated with the verbal answer provided by the first participant.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
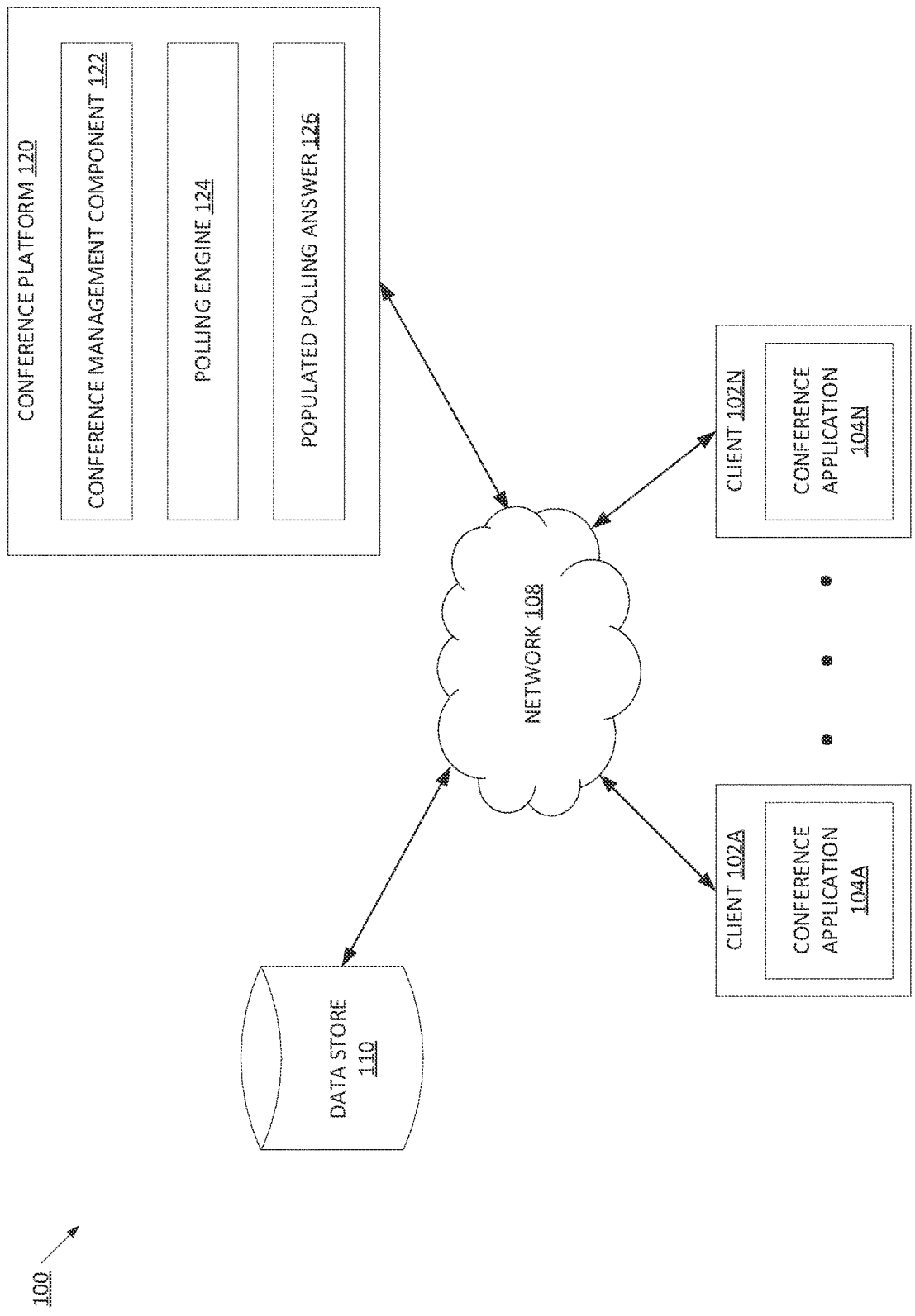
FIG. 1 illustrates an example system architecture, in accordance with implementations of the present disclosure.

Aspects of the present disclosure relate to populating answers to polling questions based on initial responses provided by participants of a conference call. A conference platform can enable video or audio-based conference call discussions between multiple participants via respective client devices that are connected over a network and share each other's audio data (e.g., voice of a user recorded via a microphone of a client device) and/or video data (e.g., a video captured by a camera of a client device) during a conference call. In some instances, a conference platform can enable a significant number of client devices (e.g., up to one hundred or more client devices) to be connected via the conference call.

A participant of a conference call may want to pose a question to the other participants of the conference call to solicit responses from the other participants (referred to as polling). The participant can provide a polling question during the conference call and the conference platform can collect responses provided by other participants of the conference call. Some existing conference platforms can provide a user interface (UI) to each client device connected to the conference call, where the UI displays the video data and/or audio data shared over the network, and can also display messages exchanged between participants during the conference call. The participant that wants to pose a polling question can pose the polling question to the other participants by causing the client devices associated with the other participants to display a message based on the polling question. For example, the participant can select a polling option in the UI of the conference platform and type the polling question in a designated area of the conference platform UI at a client device. In response to receiving the polling question, the conference platform can generate a message based on the polling question and cause the message to be displayed via the conference platform UI at the client devices associated with the other participants.

Conventionally, each conference call participant that wants to provide an answer to a polling question can think of the answer and provide the answer via the conference platform UI when the polling question is presented. However, a conference call can include a significant number of participants (e.g., tens, hundreds, thousands of participants). Each participant can take a significant amount of time (e.g., minutes) to think of an answer and provide the answer via the conference platform UI. In some instances, this can interrupt an organization or a natural flow of the conference call discussion and can cause the length of the conference call discussion to increase. If multiple polling questions are posed to participants of the conference call, the length of the conference call discussion can increase significantly. Further, an organization and/or a natural flow of the conference call discussion can be interrupted and participants may be unable to efficiently discuss each topic for the conference call. By increasing the length of the conference call discussion, additional system resources can be utilized to facilitate the connection between the client devices associated with each participant. Therefore, fewer system resources may be available to other processes, both on the client devices and computing devices hosting the conference platform, reducing an overall efficiency and increasing an overall latency for the client devices and the computing devices.

Implementations of the present disclosure address the above and other deficiencies by providing systems and methods for populating answers to polling questions based on initial responses from participants of a conference call. A conference call platform can provide a conference UI to a client device associated with each participant of a conference call. A participant of a conference call can provide a polling question to be presented to other participants of the call via the conference UI. The conference call platform can present the polling question to each of the other participants of the call via the conference UI and can also present one or more UI elements to allow each participant to provide a verbal answer to the polling question. In some embodiments, a first participant can provide a verbal answer to the polling question before other participants provide an answer. In response to detecting the first participant has provided a verbal answer, the conference platform can modify the UI for one or more other participants to present a textual form of the verbal answer provided by the first participant. The conference platform can also modify the UI to include a UI element that allows the other participants to provide an answer to the polling question that corresponds to the verbal answer provided by the first participant.

In an illustrative example, a first user can provide a verbal answer of "Wednesday" to a particular polling question. The conference platform can modify the UI of a second participant to include the textual form of the verbal answer "Wednesday" along with a UI element that enables the second participant to provide a non-verbal answer that corresponds with the answer "Wednesday." The second participant can engage with the UI element to provide the non-verbal answer or can engage with another UI element to provide (verbally or non-verbally) a different answer from the answer "Wednesday" (e.g., "Friday"). In a further example, the conference platform can modify the UI of a third participant to include the textual form of the verbal answer "Wednesday" and the answer "Friday," along with one or more UI elements that enable the third participant to provide an answer corresponding to the presented answers.

Aspects of the present disclosure automatically populate answers to polling questions to participants of a conference call based on initial responses provided by other participants of the call. During a conference call, a UI presented to a participant of the call can be updated to include the polling question and a UI element that allows the participant to provide a verbal response to the question. By allowing the participant to provide a verbal response to the question, the participant is able to more quickly provide an answer to the polling question than if he or she is providing a non-verbal answer to the question (e.g., by the participant typing the response in a text box UI element). Further, the conference platform can suggest answers to (populate answers for) a participant based on answers previously provided by other participants before the participant provides his or her answer. The participant can interact with a UI element to provide a non-verbal answer that corresponds with a previously provided answer or can provide a verbal answer, as previously described. By allowing the participant to provide a non-verbal answer based on previously provided answers, the participant can think of an answer to the polling question and can provide the answer more quickly than if the participant thinks of and/or types his or her own answer. As such, the participants of the conference call can efficiently conduct the conference call discussion with a reduced number of interruptions, thereby reducing the length of the conference call discussion. As a result of reducing the length of a conference call discussion, the amount of system resources utilized to facilitate the connection between client devices associated with each participant is decreased. Therefore, more system resources are available at the client devices and other computing devices for other processes, resulting in an increase of overall efficiency and a decrease in overall latency.

FIG. 1 illustrates an example system architecture 100, in accordance with implementations of the present disclosure. The system architecture 100 (also referred to as "system" herein) includes client devices 102A-N, a data store 110 and a conference platform 120, each connected to a network 108.

In implementations, network 108 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video data, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by conference platform 120 or one or more different machines (e.g., server machines 130-150) coupled to the conference platform 120 via network 108.

Conference platform 120 can enable users of client devices 102A-N to connect with each other via a conference call, such as a video conference call or an audio conference call. A conference call refers to an audio-based call and/or a video-based call in which participants of the call can connect with one or more additional participants. Conference platform 120 can allow a user to join and participate in a video conference call and/or an audio conference call with other users of the platform. Although embodiments of the present disclosure refer to multiple participants (e.g., 3 or more) connecting via a conference call, it should be noted that embodiments of the present disclosure can be implemented with any number of participants connecting via the conference call (e.g., 2 or more).

The client devices 102A-N may each include computing devices such as personal computers (PCs), laptops, mobile phones, smart phones, tablet computers, netbook computers, network-connected televisions, etc. In some implementations, client devices 102A-N may also be referred to as "user devices." Each client device 102A-N can include a web browser and/or a client application (e.g., a mobile application or a desktop application), such as conference application 104A-N. In some implementations, the web browser and/or conference application 104 can display a graphical user interface (GUI), provided by conference platform 120, for users to access conference platform 120. For example, a user can join and participate in a video conference call or an audio conference call via a GUI provided by conference platform 120 and presented by conference application 104.

Each client device 102A-N can include an audiovisual component that can generate audio and video data to be streamed to conference platform 120. In some implementations, the audiovisual component can include a device (e.g., a microphone) to capture an audio signal representing speech of a user and generate audio data (e.g., an audio file) based on the captured audio signal. The audiovisual component can include another device (e.g., a speaker) to output audio data to a user associated with a particular client device 102A-N. In some implementations, the audiovisual component can also include an image capture device (e.g., a camera) to capture images and generate video data of the captured data of the captured images.

In some implementations, conference platform 120 can include a conference management component 122. Conference management component 122 is configured to manage a conference call between multiple users of conference platform 120. In some implementations, conference management component 122 can provide the GUI to each client device to enable users to watch and listen to each other during a conference call. Conference management component 122 can also collect and provide data associated with the conference call to each participant of the call. For example, conference management component 122 can detect a particular user that is talking during the conference call and provide a notification to each client device associated with the conference call including an identifier of the particular user. In some instances, the conference management component 122 and/or components of each respective client device 102A-N can modify the UI based on the notification.

As described previously, an audiovisual component of each client device 102A-N can capture audio signals representing speech of a user and generate audio data based on the captured audio signal. For example, a participant to a conference call can provide a verbal phrase. The audiovisual component of the client device associated with the participant can capture audio signals recognizing the verbal phrase provided by the participant and generate audio data (e.g., an audio file) based on the captured audio signal. In some implementations, the client device 102A-N can transmit the generated audio data to conference management component 122. Conference management component 122 can generate, based on the received audio data, one or more text strings including verbal phrases provided by the participant, in some embodiments. For example, conference management component 122 can convert an audio file received from a client device 102A-N into a file including the one or more text strings. Conference management component 122 can store the one or more text strings, or the file including the one or more text strings, at data store 110. In additional or alternative embodiments, conference management component 122 can store the audio data (e.g., the received audio file) at data store 110.

In some embodiments, conference management component 122 can receive audio data at multiple instances during the conference call. For example, each instance that a participant provides a verbal phrase, the audiovisual component of the client device associated with the participant can generate audio data based on the verbal phrase and transmit the audio data to conference management component 122. In accordance with previously described embodiments, conference management component 122 can generate separate text strings that include each verbal phrase provided by a participant of the conference call as each verbal phrase is recorded at a respective client device. During or after completion of the conference call (e.g., after each participant of the call has ended a connection between a client device and the conference platform), conference management component can generate a transcript of the conference call based on each separate generated text string and store the generated transcript at data store 110.

Conference management component 122 can enable participants of the conference call to poll other participants during the conference call. A participant can poll other participants of a conference call by posing a question to the other participants to solicit responses to the question. In some implementations, a participant can pose a question to other participants by providing the question via a GUI element of the GUI provided by the conference management component 122. For example, the GUI provided by conference management component 122 can include a text box to enable a participant to type a question for polling and a GUI element (e.g., a button) configured to enable the participant to submit the question to conference platform 120.

In another example, the GUI provided by conference management component 122 can include a GUI element (e.g., a button) to enable the participant to verbally provide the question for polling. In response to detecting the participant has interacted with the GUI element, a client device 102A-N associated with the participant can initiate a recording function causing the audiovisual component of the client device 102A-N to generate audio data (e.g., an audio file) for a verbal phrase provided by the participant. In some embodiments, the client device 102A-N terminates the recording function in response to detecting a subsequent interaction with the GUI element (e.g., the participant has subsequently interacted with the GUI element, the participant has stopped interacting with the GUI element, etc.). In other or similar embodiments, the client device 102A-N terminates the recording function in response to determining a particular amount of time has passed since the participant initially interacted with the GUI element. The client device 102A-N can transmit the generated audio data to conference management component 122 and conference management component 122 can, in some embodiments, generate one or more text strings based on the received audio data, as described previously. In some embodiments, the client device 102A-N can transmit a message with the generated audio data indicating that the audio data was generated in response to the participant interacting with the GUI element. In such embodiments, conference management component 122 can determine, based on the message, that the verbal phrase corresponds to a polling question and can present the polling question to other participants of the conference call, in accordance with embodiments described herein.

In other or similar embodiments, the participant can verbally provide the question for polling other participants without interacting with a GUI element. For example, the participant can provide one or more verbal phrases during a conference call. The audiovisual component of the client device 102A-N associated with the participant can generate audio data based on an audio signal recognizing the verbal phrases and can transmit the generated audio data to conference management component 122, in accordance with previously described embodiments. In some embodiments, conference management component 122 can provide the audio data to polling engine 124. In additional or alternative embodiments, conference management component 122 can generate one or more text strings including the verbal phrases and can provide the generated text strings to polling engine 124.

Polling engine 124 can be configured to facilitate polling of conference call participants, in accordance with embodiments described herein. In some embodiments, polling engine 124 can provide the audio data and/or the text strings received from conference management component 124 as input to a trained machine learning model. The machine learning model can be trained to receive, as an input, one or more verbal phrases (i.e., as audio data and/or as one or more text strings) and provide, as output, a level of confidence that a verbal phrase includes a question associated with polling.

In some embodiments, the machine learning model can be trained based on verbal phrases that have been previously provided by users of a platform for polling other users of the platform. The platform can receive the verbal phrases (e.g., as audio data, as a text string, etc.) from a client device and can store the received verbal phrases at data store 110, in some embodiments. For example, the platform can be a conference platform 120 and the platform can receive verbal phrases including questions that were used for polling from a client device, in accordance with previously described embodiments. In another example, the platform can be a collaboration platform (not shown) that is configured to enable users to prepare surveys for polling other users of the collaboration platform. A user can provide (e.g., via a UI provided by the collaboration platform) one or more questions to be included in the survey. The verbal phrases used to train the model can include the one or more user-provided questions to be included in the survey.

A training engine (not shown) can generate training data based on the previously provided verbal phrases at data store 110. The training data can include a set of training inputs and a corresponding set of target outputs. The set of training inputs can include a phrase (e.g., audio data, a text string) previously provided by a user of the platform and, in some embodiments, can include one or more attributes associated with the previously provided phrase. An attribute can include an indication of whether a respective previously provided phrase includes a question, a question type associated with the previously provided question, and so forth. If a respective training input includes audio data (e.g., an audio recording) for a previously provided phrase, the attributes associated with the training input can include an identifier for a portion of the audio recording (e.g., a timestamp) at which an inflection of a user's voice corresponds to a question (e.g., the user's inflection is elevated to a higher pitch). The set of target outputs can include data pertaining to whether each respective previously provided phrase of the set of training inputs includes a question that was previously used for polling.

The training engine can train a machine learning model using the generated training data. In some embodiments, a machine learning model can refer to the model artifact that is created by the training engine using the training data that includes the set of training inputs and the set of corresponding target outputs (i.e., the correct answers for respective training inputs). The training engine can find patterns in the training data that map the training input to the target outputs (i.e., the answer to be predicted), and provide the machine learning model that captures these patterns. In some embodiments, the machine learning model can be composed of, for example, a single level of linear or non-linear operations (e.g., a support vector machine (SVM) or a deep network, i.e., a machine learning model that is composed of multiple levels of non-linear operations). An example of a deep network is a neural network with one or more hidden layers and such a machine learning model can be trained by, for example, adjusting weights of a neural network in accordance with a backpropogation learning algorithm, or the like.

In response to providing the audio data and/or the text strings as input to the trained machine learning model, polling engine 124 can receive an output of the trained machine learning model and determine, based on the received output, whether a level of confidence for a verbal phrase satisfies a confidence criterion (e.g., whether the level of confidence for the verbal phrase exceeds a threshold level of confidence). In response to determining the level of confidence satisfies the confidence criterion, polling engine 124 can designate the verbal phrase as a polling question. Conference management component 122 can present the designated polling question to the other participants of the conference call, in accordance with embodiments described herein.

Conference management component 122 can receive one or more answers to a polling question in response to presenting the polling question to participants via the GUI. For example, the GUI provided by conference platform 120 can be modified to present the polling question and one or more GUI elements that allow a participant to provide an answer to the polling question. In some implementations, a GUI element can allow the participant to provide a verbal answer to the polling question. The client device 102A-N associated with the participant can detect that the participant has interacted with the GUI element and can initiate a recording function, in accordance with previously described embodiments. In response to detecting the participant has completed providing the verbal answer (e.g., the participant has subsequently interacted with the GUI element, the participant has stopped interacting with the GUI element, etc.), the client device 102A-N can terminate the recording function and can transmit audio data associated with the verbal answer to conference management component 122.

Conference management component 122 can generate one or more text strings based on the received audio data and can transmit one or more of the generated text strings including the verbal answer to a client device 102A-N of an additional participant that has not yet provided an answer to the polling question. Conference management component 122 can automatically (without any request from any user) populate a possible answer(s) to the polling question for participants based on previously received answers. For example, the GUI provided by conference platform 120 can be modified to present a textual form of the verbal answer and a GUI element (e.g., a button) that allows the participant to provide a non-verbal answer to the polling question. For example, the additional participant can interact with the GUI element to provide an answer to the polling question that corresponds to the verbal answer. Additionally or alternatively, the additional participant can interact with another GUI element that allows the participant to provide a verbal answer to the polling question. For example, if the additional participant does not agree with the verbal answer presented via the GUI, the additional participant can interact with the GUI element that allows the additional participant to provide a verbal response, in accordance with previous embodiments. The client device 102A-N can transmit data associated with a response provided by the additional participant (i.e., a verbal answer or a non-verbal answer) to conference management component 122. Further details regarding collecting and populating answers to a polling question are provided herein.

In some implementations, conference platform 120 can operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a conference call. In some implementations, the functions of conference platform 120 may be provided by a more than one machine. For example, in some implementations, the functions of conference management component 122 and polling engine 124 may be provided by two or more separate server machines. Conference platform 120 may also include a website (e.g., a webpage) or application back-end software that may be used to enable a user to connect with other users via the conference call.

In general, functions described in implementations as being performed by conference platform 120 can also be performed on the client devices 102A-N in other implementations, if appropriate. In addition, the functionality attributed to a particular component can be performed by different or multiple components operating together. Conference platform 120 can also be accessed as a service provided to other systems or devices through appropriate application programming interfaces, and thus is not limited to use in websites.

Although implementations of the disclosure are discussed in terms of conference platform 120 and users of conference platform 120 participating in a video and/or audio conference call, implementations can also be generally applied to any type of telephone call or conference call between users. Implementations of the disclosure are not limited to content sharing platforms that provide conference call tools to users.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user". In another example, an automated consumer can be an automated ingestion pipeline, such as a topic channel, of the conference platform 120.

In situations in which the systems discussed here collect personal information about users, or can make use of personal information, the users can be provided with an opportunity to control whether conference platform 120 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the conference platform 120.

Figure 2:
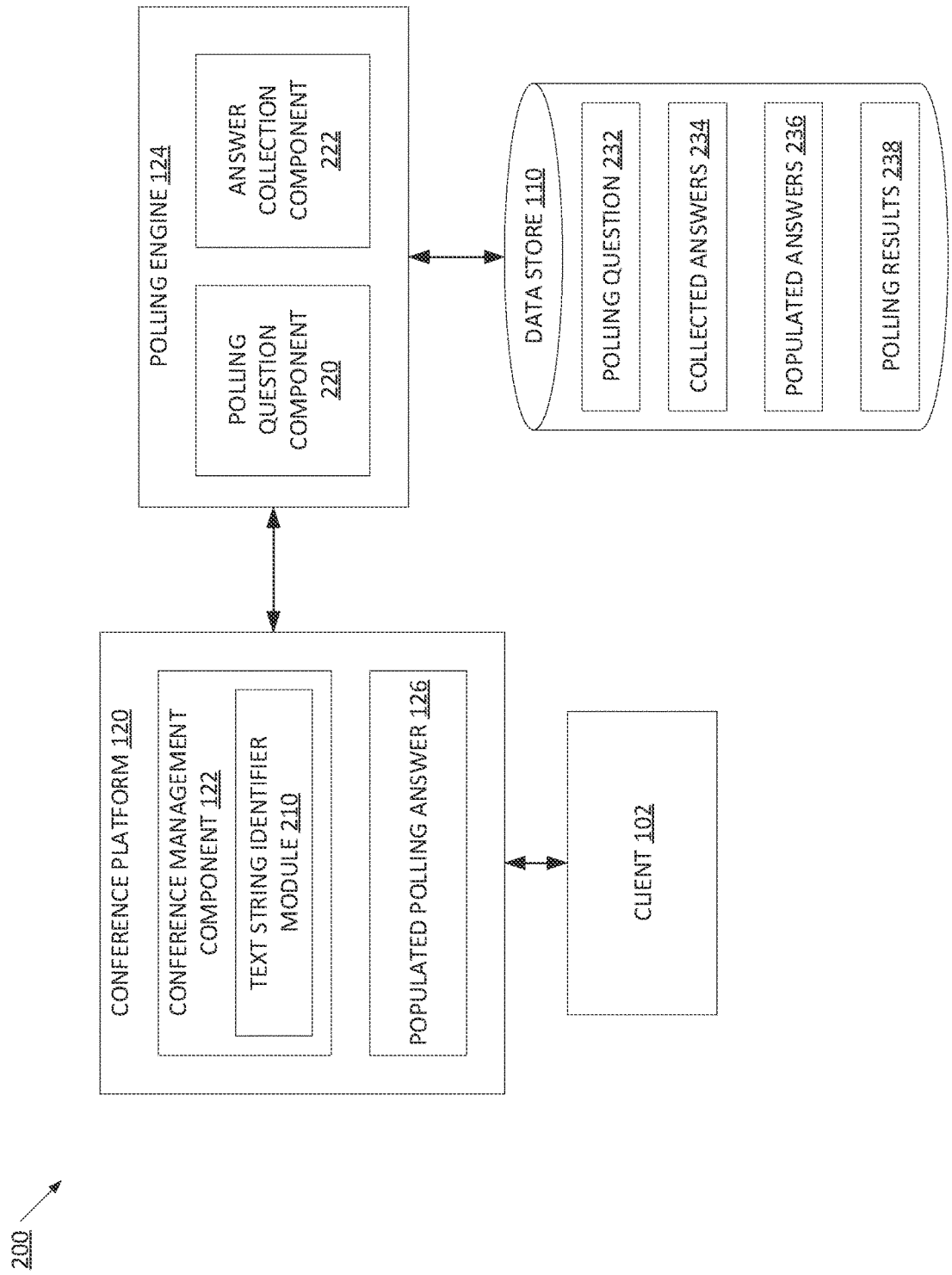
FIG. 2 is a block diagram illustrating a conference platform and a polling engine for the conference platform, in accordance with implementations of the present disclosure.

FIG. 2 is a block diagram illustrating a conference platform 120 and a polling engine 151, in accordance with implementations of the present disclosure. As described with respect to FIG. 1, conference platform 120 can provide tools to users of a client device 102 to join and participate in a video and/or audio conference call. Conference platform 120 can include a conference management component 122. Conference management component 122 can include a text string identifier module 210. As described above. polling engine 124 can facilitate polling of conference call participants. Polling engine 124 can include a polling question component 220, an answer collection component 222, and an answer population component 224. One or more operations performed by conference management component 122 and/or polling engine 124 are described with respect to FIGS. 3A-3D.

Figure 3A:
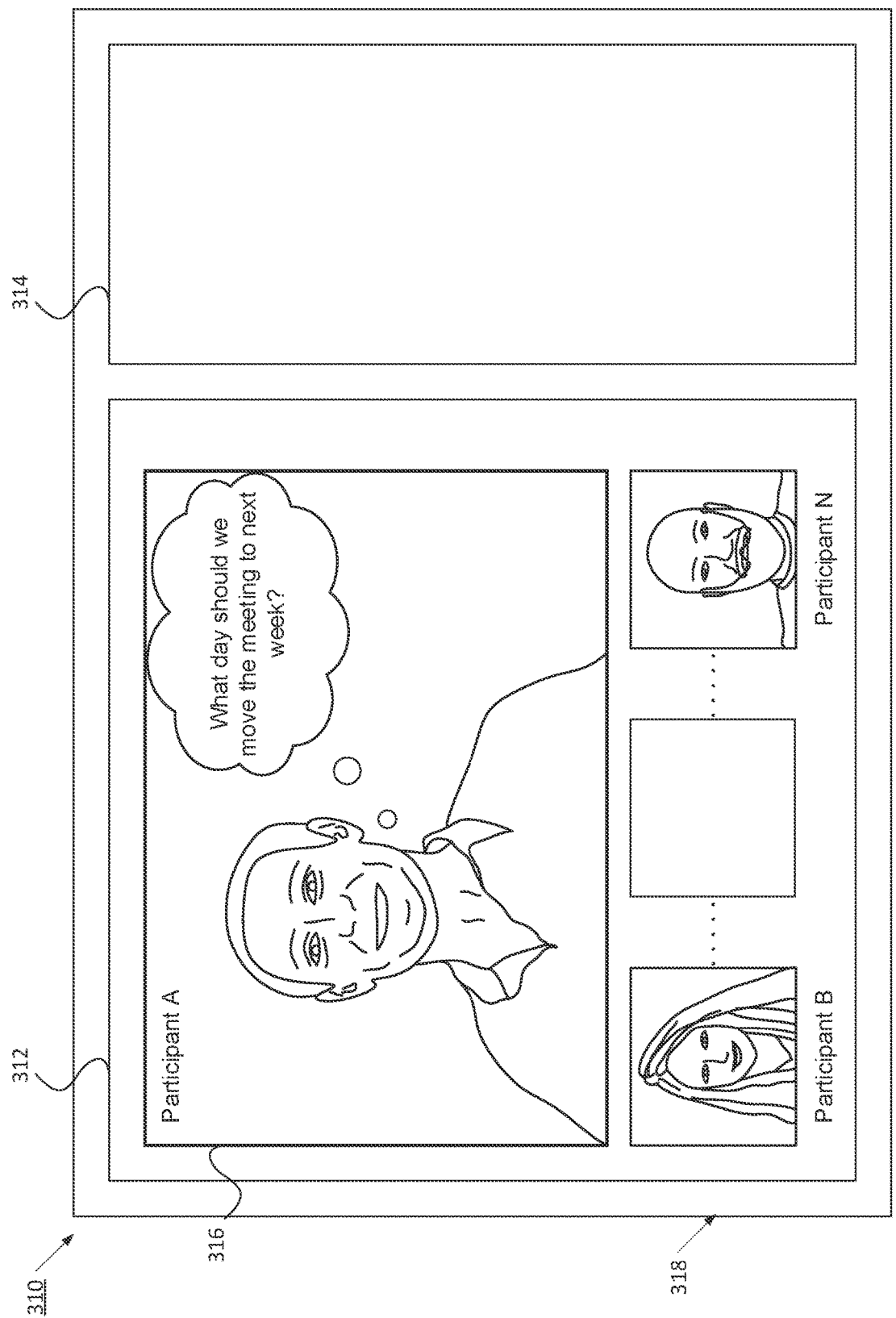
FIG. 3A illustrates an example user interface for a video conference call between multiple participants via a conference platform, in accordance with implementations of the present disclosure.

FIG. 3A illustrates an example user interface (UI) for a video conference call between multiple participants via conference platform 120, in accordance with some implementations of the disclosure. As illustrated, conference management component 122 provides a UI 310 to enable participants (e.g., participants A-N) to join and participate in a conference call. UI 310 is described as a GUI displayed via a client device 102 associated with Participant A of the conference call. However, it should be noted that UI 310 can displayed on a client device 102 associated with any participants to the conference call.

UI 310 can have multiple sections, including a first section 312 and a second section 314. In some embodiments, the first section 312 can include one or more portions for outputting video data captured at the client devices associated with each participant. For example, the first section 312 can include at least a first portion 316 and a second portion 318 that each display video data captured by user devices associated with participants of the video conference call. In some implementations, the first portion 316 of section 312 can display video data captured by a user device associated with a participant that is providing verbal statements during the conference call (i.e., the participant that is currently speaking). In other words, the first portion 316 can display video data associated with a participant that is currently speaking. As illustrated in FIG. 3A, Participant A is providing the verbal phrase "What day should we move the meeting to next week?" As such, the first portion 316 of section 312 displays video data captured by a client device associated with Participant A. Second portion 318 of section 312 can display video data captured by client devices of participants (e.g., Participants B-N) that are not currently providing verbal statements during the conference call (i.e., are not currently speaking). In other or similar embodiments, section 312 can include one or more sections that are configured to display video data associated with participants in accordance with other orientations. For example, section 312 can include a single portion that displays the video data captured by client devices of a participant that is currently speaking and does not display video data captured by client devices of participants that are not currently speaking. In another example, section 312 can include multiple portions that each display video data associated with a participant of the video conference call, regardless of whether a participant is currently speaking.

As described previously, a participant of a conference call can provide a polling question to be presented to other participants of the conference call. For example, Participant A can provide the verbal phrase "What day should we move the meeting to next week?" In some embodiments, Participant A can provide the verbal phrase in response to interacting with a particular GUI element (not shown) of UI 310 that initiates a recording operation by an audiovisual component of the client device associated with Participant A. The audiovisual component of the client device can capture an audio signal based on the provided verbal phrase and generate audio data (e.g., an audio file) based on the captured audio signal, in accordance with previously described embodiments. On other or similar embodiments, the audiovisual component can capture the audio signal without Participant A interacting with the particular GUI element to initiate the recording operation. The client device can transmit the audio data to conference management component 122. In some embodiments, the client device can transmit an identifier of the participant that provided the verbal phrase with the audio data. In response to receiving the audio data, conference management component 122 can generate, based on the received audio data, one or more text strings including the verbal phrases provided by Participant A, in accordance with previously described embodiments.

Referring back to FIG. 2, text string identifier module 210 can determine to provide the one or more text strings generated by conference management component 122 to polling question component 220. In some embodiments, text string identifier module 210 can determine to provide the one or more text strings to polling question component 220 in response to determining the verbal phrase provided by Participant A corresponds to a question phrase. For example, text string identifier module 210 can parse each received text string and determine that a context of the text string corresponds with a context of a question phrase. In some embodiments, polling question component 220 can provide a text string received from text string identifier module 210 as input to a trained machine learning model. The machine learning model can be trained to receive, as an input, text strings including a textual form of one or more verbal phrases and provide, as output, a level of confidence that a verbal phrase of the received text strings includes a question associated with polling. Polling question component 220 can obtain one or more outputs from the trained machine learning model and determine, based on the received output, whether a level of confidence for a verbal phrase satisfies a confidence criterion (e.g., whether the level of confidence for the verbal phrase exceeds a threshold level of confidence). In response to determining the level of confidence satisfies the confidence criterion, polling engine 124 can designate the verbal phrase as a polling question 232 and store the polling question 232 at data store 110.

In other or similar embodiments, polling question component 220 can determine whether a verbal phrase associated with a text string is a polling question 232 based on a message received by conference management component 122 with audio data for the verbal phrase. For example, Participant A can interact with a GUI element to initiate the recording operation at the client device. In such example, the client device can transmit a message with audio data associated with the recorded verbal phrase that indicates the verbal phrase corresponds to a polling question. Polling question component 220 can designate the verbal phrase as a polling question 232, in view of the received message, and store the polling question 232 at data store 110.

In some implementations, polling question component 220 can cause the UI to present the polling question 232 to Participant A only (or alternatively to some participants designated by Participant A) and request Participant A to confirm that Participant A wants the polling question 232 to be presented to other participants (all other participants or some of the other participants as designated by Participant A).

As described above, in some embodiments, Participant A can provide a polling question for presentation to other participants (e.g., Participants B-N) without providing a verbal phrase. For example, Participant A can type the polling question into a textbox GUI element. In such embodiments, conference management component 122 can receive the non-verbal phrase from the client device associated with Participant A along with a message indicating that the non-verbal phrase corresponds with a polling question. Conference management component 122 can transmit a text string including the non-verbal phrase to polling question component 220. Polling question component 220 can designate the non-verbal phrase as a polling question based on the received message from the client device, in accordance with previously described embodiments.

In response to polling question component 220 designating a phrase (verbal or non-verbal) as a polling question, conference management component 122 can transmit a textual form of the polling question 232 for presentation at client devices associated with additional participants of the conference call. For example, in response to polling question component 220 designating a verbal phrase provided by Participant A as a polling question 232, conference management component 122 can transmit the textual form of the polling question 232 for presentation at client devices associated with Participants B-N.

Figure 3B:
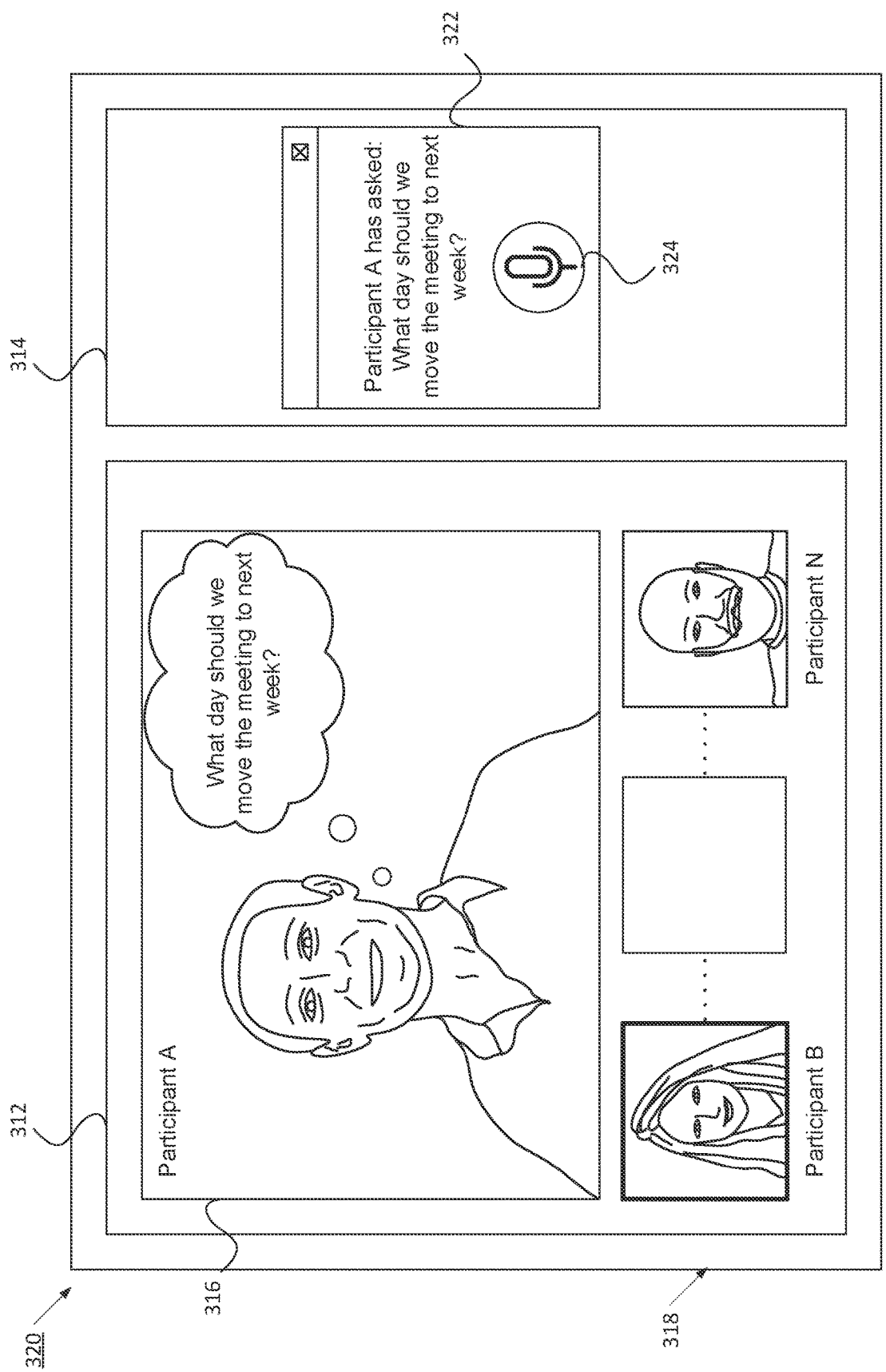
FIG. 3B illustrates a sample UI for a participant responding to a polling question during the conference call, in accordance with implementations of the present disclosure.

FIG. 3B illustrates a sample UI 320 for Participant B responding to a polling question during the conference call. As illustrated, in response to polling question component 220 designating the question "What day should we move the meeting to next week?" as a polling question 232, conference management component 122 causes UI 320 to present a message 322 including the posed question at section 314. In some embodiments, section 314 also includes a GUI element 324 that allows Participant B to provide a verbal answer to the polling question. In response to Participant B interacting with GUI element 324, the client device associated with Participant B can initiate a recording operation to generate audio data for the provided verbal answer, in accordance with previously described embodiments. The client device can transmit the audio data associated with the provided verbal answer to conference management component 122 and conference management component 122 can generate one or more text strings including the provided verbal answer, as previously described. In some embodiments, the client device can also transmit a message to conference management component 122 indicating that the provided verbal answer corresponds to an answer phrase, as the verbal phrase was provided in response to UI 320 presenting polling question 232.

Referring back to FIG. 2, text string identifier module 210 can determine whether the provided verbal answer included in the one or more text strings corresponds to an answer phrase. For example, text string identifier module 210 can parse each text string and determine that a context of the text string corresponds with a context of an answer phrase. In another example, text string identifier module 210 can determine that the provided verbal answer corresponds to an answer phrase based on the received message from the client device, in accordance with previously described embodiments. In response to determining the provided verbal answer corresponds to an answer phrase, text string identifier module 210 can provide the one or more text strings including the verbal answer to polling answer component 222.

Polling answer component 222 can store the provided verbal answer as a collected answer 234 at data store 110. In some embodiments, polling answer component 222 can determine whether a textual form of the provided verbal answer is to be presented to one or more additional participants of the conference call as a candidate answer for polling question 232. Polling answer component 222 can determine that the provided verbal answer is to be presented to the additional participants in response to determining that the provided verbal answer satisfies an answer criterion. A provided answer can satisfy the answer criterion in response to polling answer component 222 determining that the number of participants of the conference call that provided a corresponding answer satisfies a threshold number. For example, in response to the polling question "What day should we move the meeting to next week?," Participant B can provide the verbal answer of "Wednesday." Polling answer component 222 can determine, based on collected answers 234, a number of additional participants of the conference call that also provided an answer (verbal or non-verbal) of "Wednesday." In response to determining that the total number of answers that correspond to the answer "Wednesday" satisfies a threshold number, polling answer component 222 can determine that the textual form of the provided verbal answer is to be presented to one or more participants of the conference call (only additional participants or alternatively one or more additional participants as well as Participant B). In some embodiments, polling answer component 222 can determine that the provided verbal answer is to be presented to the participants in response to receiving the one or more text strings including the verbal answer and without determining whether the verbal answer satisfies the answer criterion.

In some embodiments, polling answer component 222 can determine one or more additional answer candidates to be presented to the additional participants with the provided verbal answer. For example, polling answer 222 can determine that a context of the verbal answer provided by Participant B ("Wednesday") corresponds to a day of the week. Polling answer 222 can determine, based on the answer context, that answers to the polling question correspond to a particular day of the week and can designate the polling question as a "day of the week" type question. In response to designating the polling question as a "day of the week" type question, polling answer component 222 can determine one or more answer candidates that correspond to a "day of the week: type question (e.g. Monday, Tuesday, Thursday, Friday, etc.). Polling answer component 222 can determine the one or more answer candidates are to be presented to the participants with the verbal answer and can store the answer candidates as populated answers 236 at data store 110.

Figure 3C:
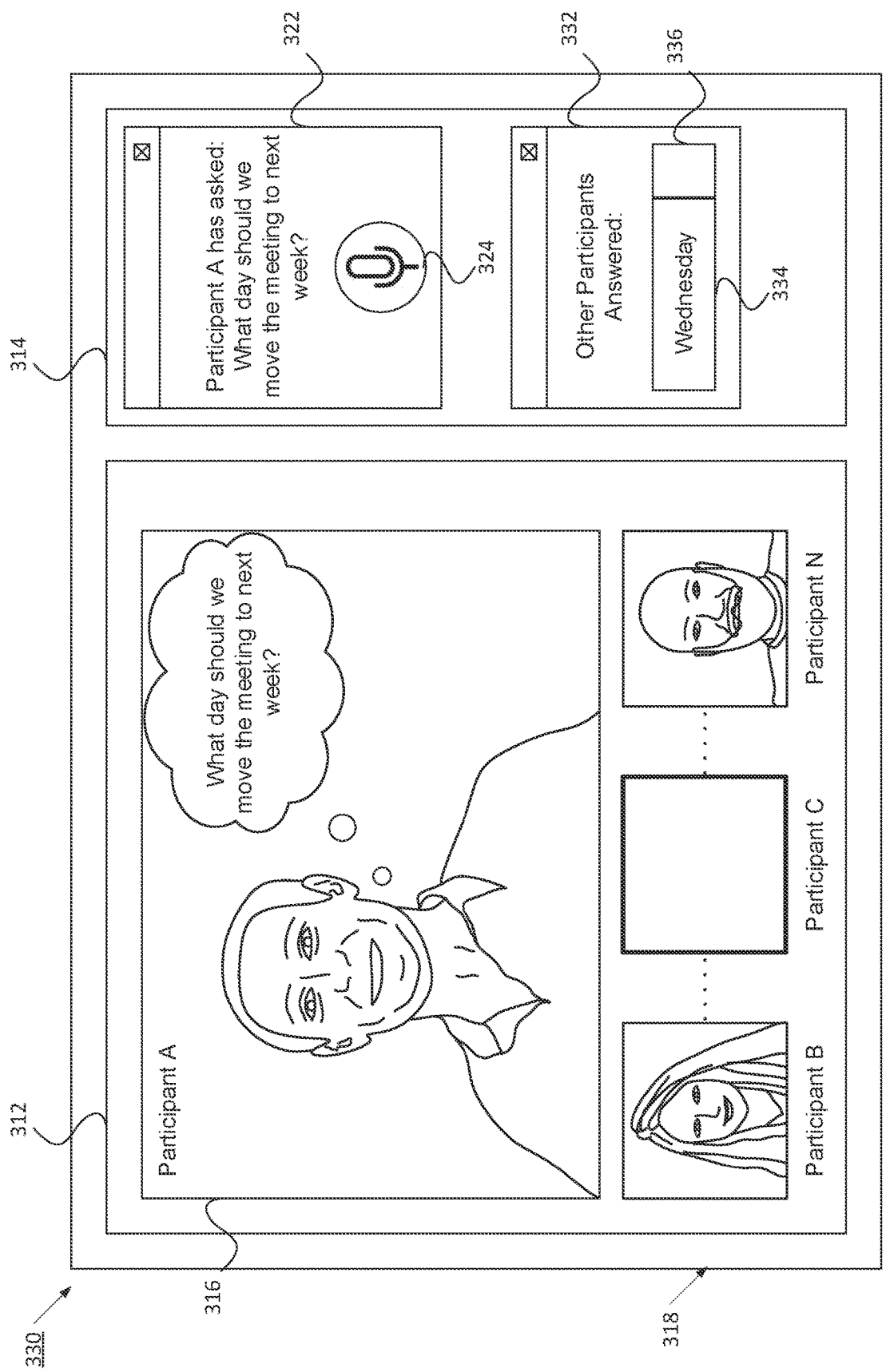
FIGS. 3C-3D illustrate sample UIs populating, for additional participants of the conference call, answers to the polling question based on the verbal answer previously provided by another participant, in accordance with implementations of the present disclosure.
Figure 3D:
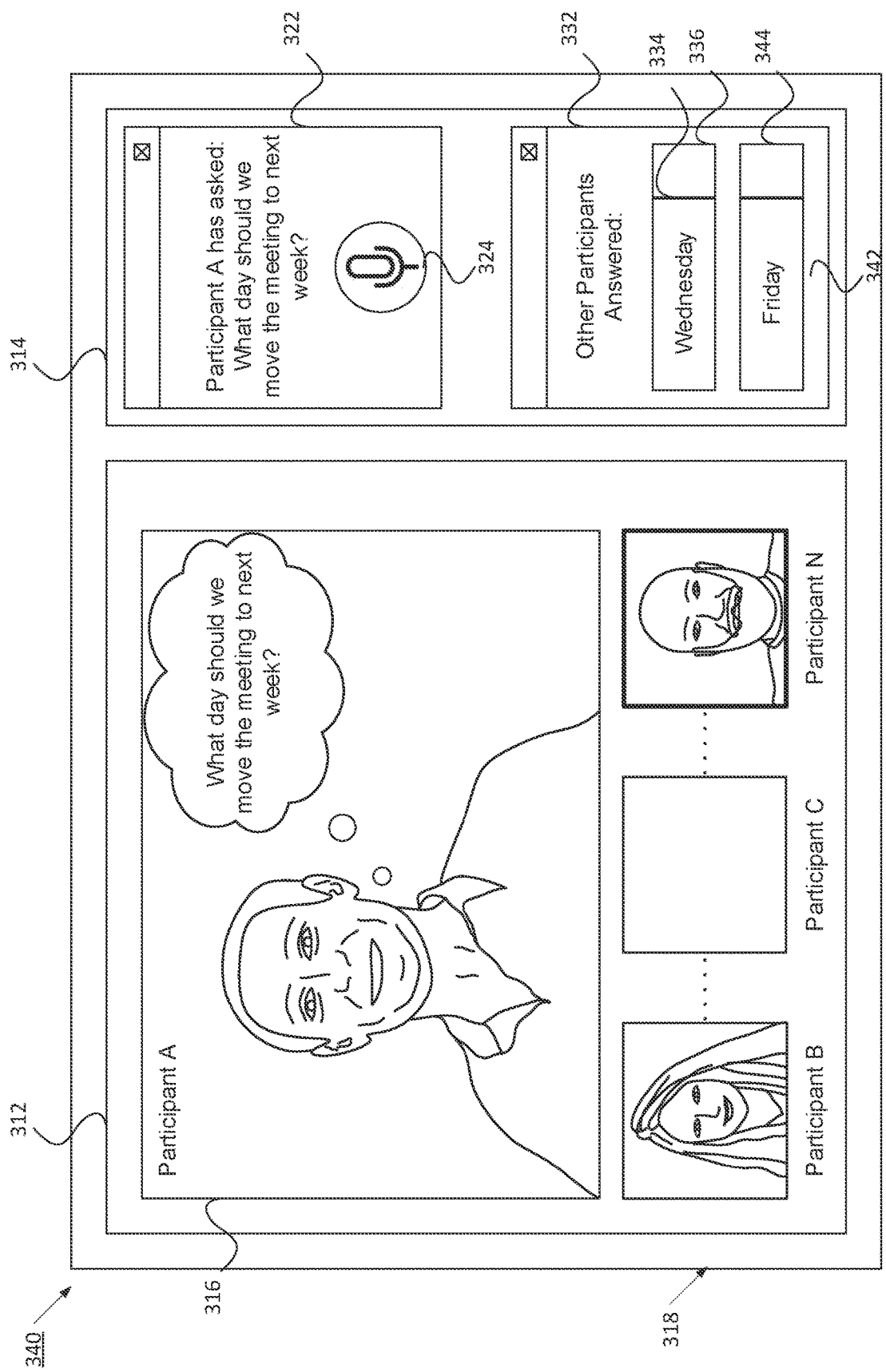

FIGS. 3C-3D illustrate sample UIs populating, for additional participants of the conference call, answers to the polling question based on the verbal answer(s) previously provided by other participant(s), in accordance with implementations of the present disclosure.

FIG. 3C illustrates a sample UI 330 for Participant C responding to a polling question during the conference call. As illustrated, in response to polling answer component 222 determining the verbal answer provided by Participant B is to be presented to additional participants of the conference call, conference management component 122 causes UI 330 to present a message 332 including the textual form of the verbal answer 334 at section 314. In some embodiments, section 314 also includes a GUI element 336 that allows Participant C to provide a non-verbal answer to the polling question. It should be noted that message 332 and/or GUI element 336 can be provided in a different section from section 314 of UI 330. Participant C can interact with GUI element 336 to provide a non-verbal answer to the polling question that corresponds with the verbal answer. For example, GUI element 336 can be a button element that Participant C can select in order to provide a non-verbal answer that corresponds with the answer of "Wednesday." Alternatively, GUI element 336 can be a check box, a button or another UI element that allows a participant to confirm that the generated text (e.g., "Wednesday") is their answer to the polling question or in some implementations, to reject the generated text (e.g., "Wednesday") as their answer to the polling question. In some implementations, GUI element 336 is an element located separately from or next to the UI element displaying the generated text (e.g., "Wednesday"). In some embodiments, message 332 can also include the textual form of each answer candidate identified by polling component 222 (not shown), in accordance with previously described embodiments, and one or more additional GUI elements that allow Participant C to provide a non-verbal answer corresponding with an answer candidate.

Additionally or alternatively, Participant C can interact with GUI element 324 to provide a verbal answer to the polling question. For example, Participant C may want to provide a different answer than the answer option (i.e., verbal answer 334, answer candidates (not shown)) included in message 332. As such, Participant C can provide a verbal answer to the polling question by interacting with GUI element 324, in accordance with previously described embodiments. In other or similar embodiments, Participant C can interact with an additional GUI element (not shown) to provide a non-verbal answer to the polling question (e.g., type a non-verbal answer in a text box element). A client device associated with Participant C can transmit data associated with the provided answer (verbal or non-verbal) to conference management component 122, as described previously.

Conference management component 122 can receive data associated with an answer (verbal or non-verbal) provided by Participant C, in accordance with previously described embodiments. In some embodiments, polling answer component 122 can determine that the answer provided by Participant C is to be presented to additional participants of the conference call. For example, Participant C can provide an answer of "Friday" to the polling question. In some embodiments, polling answer component 122 can determine that the provided answer satisfies an answer criterion and is to be presented to additional participants of the conference call, in accordance with previously described embodiments.

FIG. 3D illustrates a sample UI 340 for Participant D responding to a polling question during the conference call, in accordance with some implementations. As illustrated, in response to polling answer component 122 determining that the answer provided by Participant C satisfies the answer criterion, conference management component 122 causes a section of UI 340 include a textual form of the answer 342

(verbal or non-verbal). For example, answer 342 can be provided in message 332 at section 314. In some embodiments, section 314 (or another section of UI 340) also includes a GUI element that allows Participant D to provide a non-verbal answer to the polling question, in accordance with previously described embodiments. Additionally or alternatively, Participant D can interact with an additional GUI element (e.g., GUI element 324) to provide a different answer to the polling question, as previously described.

In some implementations, GUI elements 336 and 344 can be provided as check boxes, buttons or other type of UI element that allow a participant to confirm that the generated text (e.g., "Wednesday" or "Friday") is their answer to the polling question (or optionally to reject the generated text (e.g., "Wednesday" and/or "Friday") as their answer to the polling question). In some implementations, GUI elements 336 and 344 are elements located separately from or next to respective UI elements displaying the generated text (e.g., "Wednesday" and "Friday").

In some embodiments, a polling results component (not shown) can generate polling results 238 for polling questions 232 and answers 234 stored at data store 110. In response to the polling results component generating polling results 238, conference management component 122 can provide polling results 238 to a client device 102 associated with one or more participants of the conference call. For example, conference management component 122 can provide polling results 238 to client device associated with an organizer of the conference call.

Figure 4:
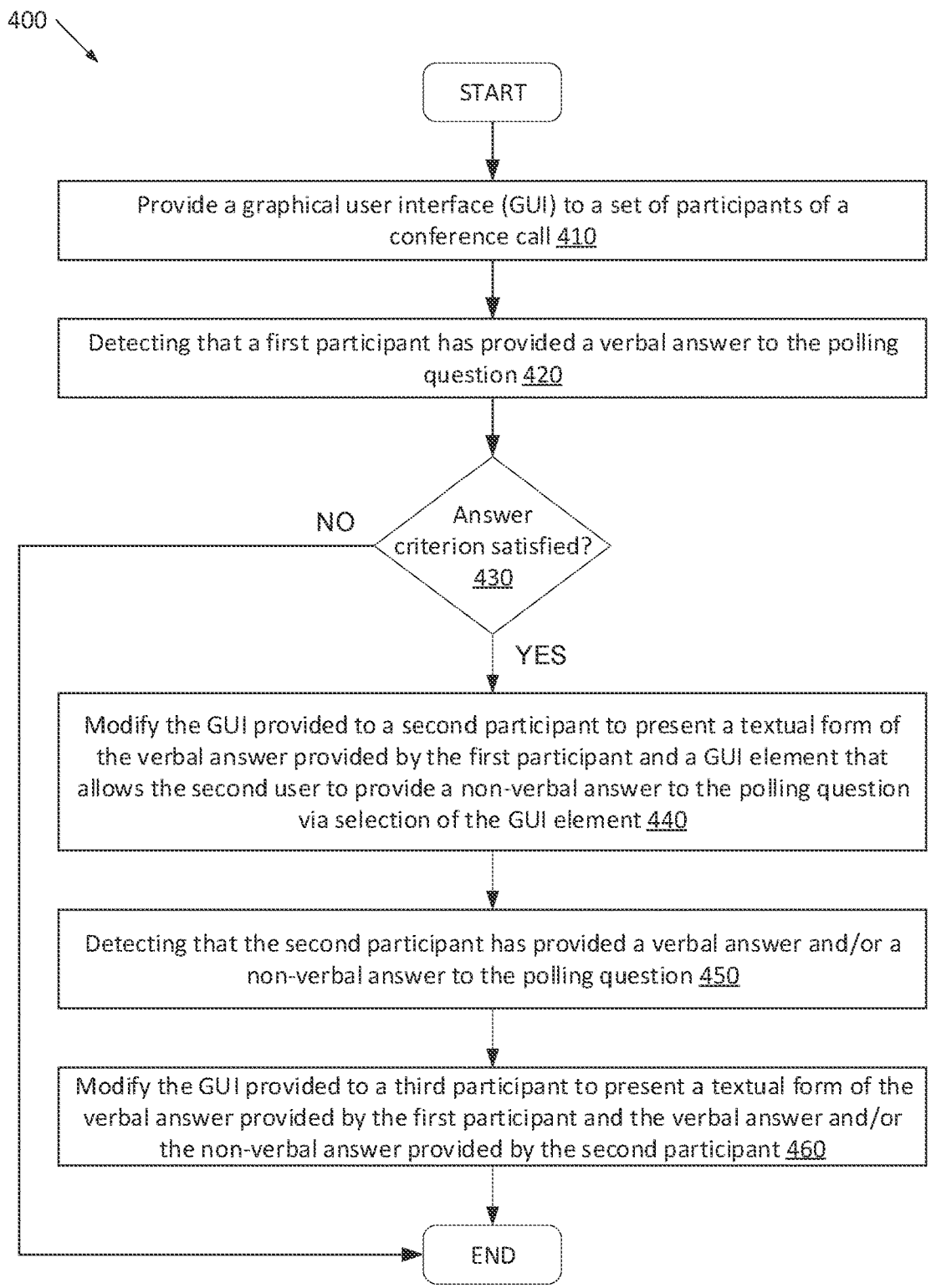
FIG. 4 depicts a flow diagram of a method for populating answers to polling questions based on initial responses, in accordance with implementations of the present disclosure.

FIG. 4 depicts a flow diagram of a method 400 for populating answers to polling questions based on initial responses, in accordance with implementations of the present disclosure. Method 400 can be performed by processing logic that can include hardware (circuitry, dedicated logic, etc.), software (e.g., instructions run on a processing device), or a combination thereof. In one implementation, some or all the operations of method 400 can be performed by one or more components of system 100 of FIG. 1.

At block 410, the processing device provides a graphical user interface (GUI) to a set of participants of a conference call. The GUI includes a first portion that presents a polling question to be answered by the set of participants. At block 420, the processing device detects that a first participant has provided a verbal answer to the polling question. At block 430, the processing device determines whether an answer criterion is satisfied. In response to determining the answer criterion is not satisfied, method 400 ends. In response to determining the answer criterion is satisfied, method 400 continues to block 440. At block 440, the processing device modifies the GUI provided to a second participant to present a textual form of the verbal answer provided by the first participant and a GUI element that allows the second user to provide a non-verbal answer to the polling question via selection of the GUI element. At block 450, the processing device detects that the second participant has provided a verbal answer and/or a non-verbal answer to the polling question. At block 460, the processing device modifies the GUI provided to a third participant to present a textual form of the verbal answer provided by the first participant and the verbal answer and/or the non-verbal answer provided by the second participant.

Figure 5:
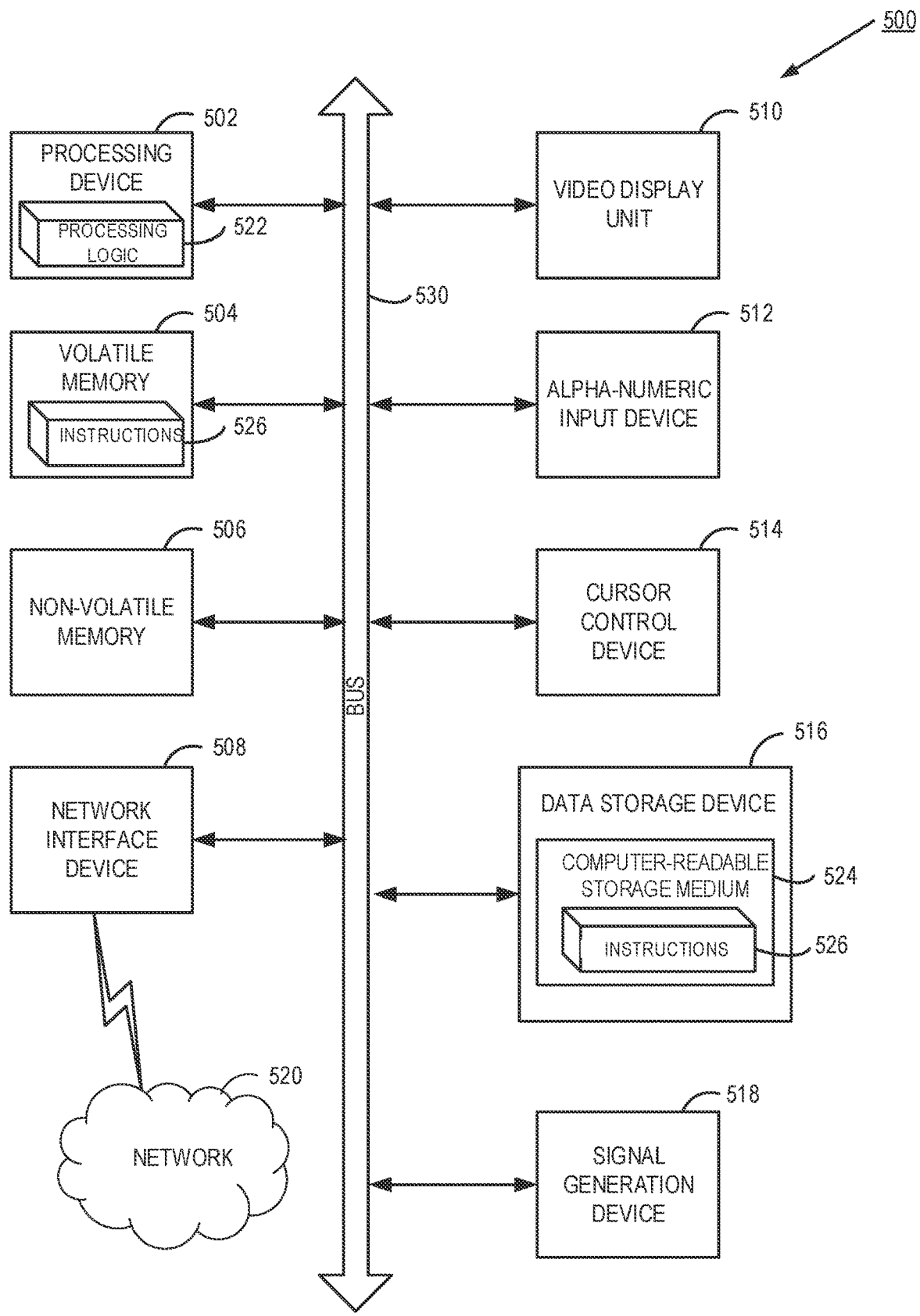
FIG. 5 is a block diagram illustrating an exemplary computer system, in accordance with implementations of the present disclosure.

FIG. 5 is a block diagram illustrating an exemplary computer system, in accordance with implementations of the present disclosure. The computer system 500 can be the conference platform 120 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., for predicting channel lineup viewership) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker).

The data storage device 518 can include a non-transitory machine-readable storage medium 524 (also computer-readable storage medium) on which is stored one or more sets of instructions 505 (e.g., for predicting channel lineup viewership) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for populating answers to polling questions based on initial responses. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   providing, to a plurality of participants of a conference call, a graphical user interface (GUI);
   determining, in view of audio data received from a client device associated with a presenter of the conference call, that the presenter has provided a polling question for the plurality of participants during the conference call;
   updating a first portion of the GUI provided to each of the plurality of participants to present a textual form of the polling question and a first GUI element that allows each participant of the plurality of participants to provide verbal answers to the polling question during the conference call; and
   responsive to detecting that a first participant of the plurality of participants has provided a verbal answer to the polling question via selection of the first GUI element, modifying the GUI provided to a second participant of the plurality of participants to present, in a second portion, a textual form of the verbal answer provided by the first participant and a second GUI element that allows the second participant to provide a non-verbal answer to the polling question via selection of the second GUI element associated with the verbal answer provided by the first participant.

2. The method of claim 1, further comprising:
   detecting that the second participant has provided at least one of a verbal answer or a non-verbal answer to the polling question; and
   modifying the GUI provided to a third participant of the plurality of participants to present, via the second portion of the GUI, the textual form of the verbal answer provided by the second participant and an additional GUI element that allows the third participant to provide an additional non-verbal answer to the polling question via selection of the additional GUI element associated with the at least one of the verbal answer or the non-verbal answer provided by the second participant.

3. The method of claim 1, wherein the GUI provided to the second participant of the plurality of participants is modified to present the second portion responsive to determining that the verbal answer provided by the first participant satisfies an answer criterion.

4. The method of claim 3, wherein determining that the verbal answer provided by the first participant satisfies the answer criterion comprises:
   determining that the verbal answer provided by the first participant corresponds to a set of particular answers to the polling question, wherein each of the set of particular answers is provided by a respective participant of the plurality of participants; and
   calculating a total number of the particular answers provided for the polling question based on the set of particular answers and the verbal answer provided by the first participant,
   wherein the answer criterion is determined to be satisfied responsive to the total number of the particular answers exceeding a threshold number of answers.

5. The method of claim 1, wherein detecting that the first participant has provided the verbal answer to the polling question comprises:
   generating an audio file comprising one or more verbal phrases provided by the first participant;
   converting content of the audio file into one or more text strings; and
   identifying the textual form of the verbal answer from the one or more text strings.

6. The method of claim 1, further comprising:
   determining, based on the verbal answer provided by the first participant, one or more answer candidates for the polling question, wherein the second portion of the GUI provided to the second participant is to further include a textual form of each of the determined one or more answer candidates and one or more additional GUI elements that allows the second participant to provide a non-verbal answer to the polling question via selection of an additional GUI element associated with a respective answer candidate.

7. The method of claim 1, further comprising:
   responsive to detecting that a third participant of the plurality of participants has provided at least one of an additional verbal answer or an additional non-verbal answer to the polling question, updating the modified GUI provided to the second participant to present, in a third portion, a textual form of the at least one of the additional verbal answer or the non-verbal answer provided by the third participant and one or more additional GUI elements that allows the second participant to provide the non-verbal answer to the polling question via selection of a respective additional GUI element associated with the at least one of the additional verbal answer or the additional non-verbal answer provided by the third participant.

8. A system comprising:
   a memory; and
   a processing device coupled to the memory, the processing device to perform operations comprising:
      providing, to a plurality of participants of a conference call, a graphical user interface (GUI);
      determining, in view of audio data received from a client device associated with a presenter of the conference call, that the presenter has provided a polling question for the plurality of participants during the conference call;
      updating a first portion of the GUI provided to each of the plurality of participants to present a textual form of the polling question and a first GUI element that allows each participant of the plurality of participants to provide verbal answers to the polling question during the conference call; and
      responsive to detecting that a first participant of the plurality of participants has provided a verbal answer to the polling question via selection of the first GUI element, modifying the GUI provided to a second participant of the plurality of participants to present, in a second portion, a textual form of the verbal answer provided by the first participant and a second GUI element that allows the second participant to provide a non-verbal answer to the polling question via selection of the second GUI element associated with the verbal answer provided by the first participant.

9. The system of claim 8, wherein the processing device to perform operations further comprising:
   detecting that the second participant has provided at least one of a verbal answer or a non-verbal answer to the polling question; and
   modifying the GUI provided to a third participant of the plurality of participants to present, via the second portion of the GUI, the textual form of the verbal answer provided by the second participant and an additional GUI element that allows the third participant to provide an additional non-verbal answer to the polling question via selection of the additional GUI element associated with the at least one of the verbal answer or the non-verbal answer provided by the second participant.

10. The system of claim 8, wherein the processing device is to modify the GUI provided to the second participant of the plurality of participants to present the second portion responsive to determining that the verbal answer provided by the first participant satisfies an answer criterion.

11. The system of claim 10, wherein to determine that the verbal answer provided by the first participant satisfies the answer criterion, the processing device is to perform operations comprising:
   determining that the verbal answer provided by the first participant corresponds to a set of particular answers to the polling question, wherein each of the set of particular answers is provided by a respective participant of the plurality of participants; and
   calculating a total number of the particular answers provided for the polling question based on the set of particular answers and the verbal answer provided by the first participant,
   wherein the answer criterion is determined to be satisfied responsive to the total number of the particular answers exceeding a threshold number of answers.

12. The system of claim 8, wherein to detect that the first participant has provided the verbal answer to the polling question, the processing device is to perform operations comprising:
   generating an audio file comprising one or more verbal phrases provided by the first participant;
   converting content of the audio file into one or more text strings; and
   identifying the textual form of the verbal answer from the one or more text strings.

13. The system of claim 8, wherein the processing device is to perform operations further comprising:
  determining, based on the verbal answer provided by the first participant, one or more answer candidates for the polling question, wherein the second portion of the GUI provided to the second participant is to further include a textual form of each of the determined one or more answer candidates and one or more additional GUI elements that allows the second participant to provide a non-verbal answer to the polling question via selection of an additional GUI element associated with a respective answer candidate.

14. A non-transitory computer readable storage medium comprising instructions for a server that, when executed by a processing device, cause the processing device to perform operations comprising:
  providing, to a plurality of participants of a conference call, a graphical user interface (GUI);
  determining, in view of audio data received from a client device associated with a presenter of the conference call, that the presenter has provided a polling question the plurality of participants during the conference call;
  updating a first portion of the GUI provided to each of the plurality of participants to present a textual form of the polling question and a first GUI element that allows each participant of the plurality of participants to provide verbal answers to the polling question during the conference call; and
  responsive to detecting that a first participant of the plurality of participants has provided a verbal answer to the polling question via selection of the first GUI element, modifying the GUI provided to a second participant of the plurality of participants to present, in a second portion, a textual form of the verbal answer provided by the first participant and a second GUI element that allows the second participant to provide a non-verbal answer to the polling question via selection of the second GUI element associated with the verbal answer provided by the first participant.

15. The non-transitory computer readable storage medium of claim 14, wherein the processing device to perform operations further comprising:
  detecting that the second participant has provided at least one of a verbal answer or a non-verbal answer to the polling question; and
  modifying the GUI provided to a third participant of the plurality of participants to present, via the second portion of the GUI, the textual form of the verbal answer provided by the second participant and an additional GUI element that allows the third participant to provide an additional non-verbal answer to the polling question via selection of the additional GUI element associated with the at least one of the verbal answer or the non-verbal answer provided by the second participant.

16. The non-transitory computer readable storage medium of claim 14, wherein the processing device is to modify the GUI provided to the second participant of the plurality of participants to present the second portion responsive to determining that the verbal answer provided by the first participant satisfies an answer criterion.

17. The non-transitory computer readable storage medium of claim 16, wherein to determine that the verbal answer provided by the first participant satisfies the answer criterion, the processing device is to perform operations comprising:
  determining that the verbal answer provided by the first participant corresponds to a set of particular answers to the polling question, wherein each of the set of particular answers is provided by a respective participant of the plurality of participants; and
  calculating a total number of the particular answers provided for the polling question based on the set of particular answers and the verbal answer provided by the first participant,
  wherein the answer criterion is determined to be satisfied responsive to the total number of the particular answers exceeding a threshold number of answers.

18. The non-transitory computer readable storage medium of claim 14, wherein to detect that the first participant has provided the verbal answer to the polling question, the processing device is to perform operations comprising:
  generating an audio file comprising one or more verbal phrases provided by the first participant;
  converting content of the audio file into one or more text strings; and
  identifying the textual form of the verbal answer from the one or more text strings.

19. The non-transitory computer readable storage medium of claim 14, wherein the processing device is to perform operations further comprising:
  determining, based on the verbal answer provided by the first participant, one or more answer candidates for the polling question, wherein the second portion of the GUI provided to the second participant is to further include a textual form of each of the determined one or more answer candidates and one or more additional GUI elements that allows the second participant to provide a non-verbal answer to the polling question via selection of an additional GUI element associated with a respective answer candidate.

* * * * *